UNITED STATES PATENT OFFICE.

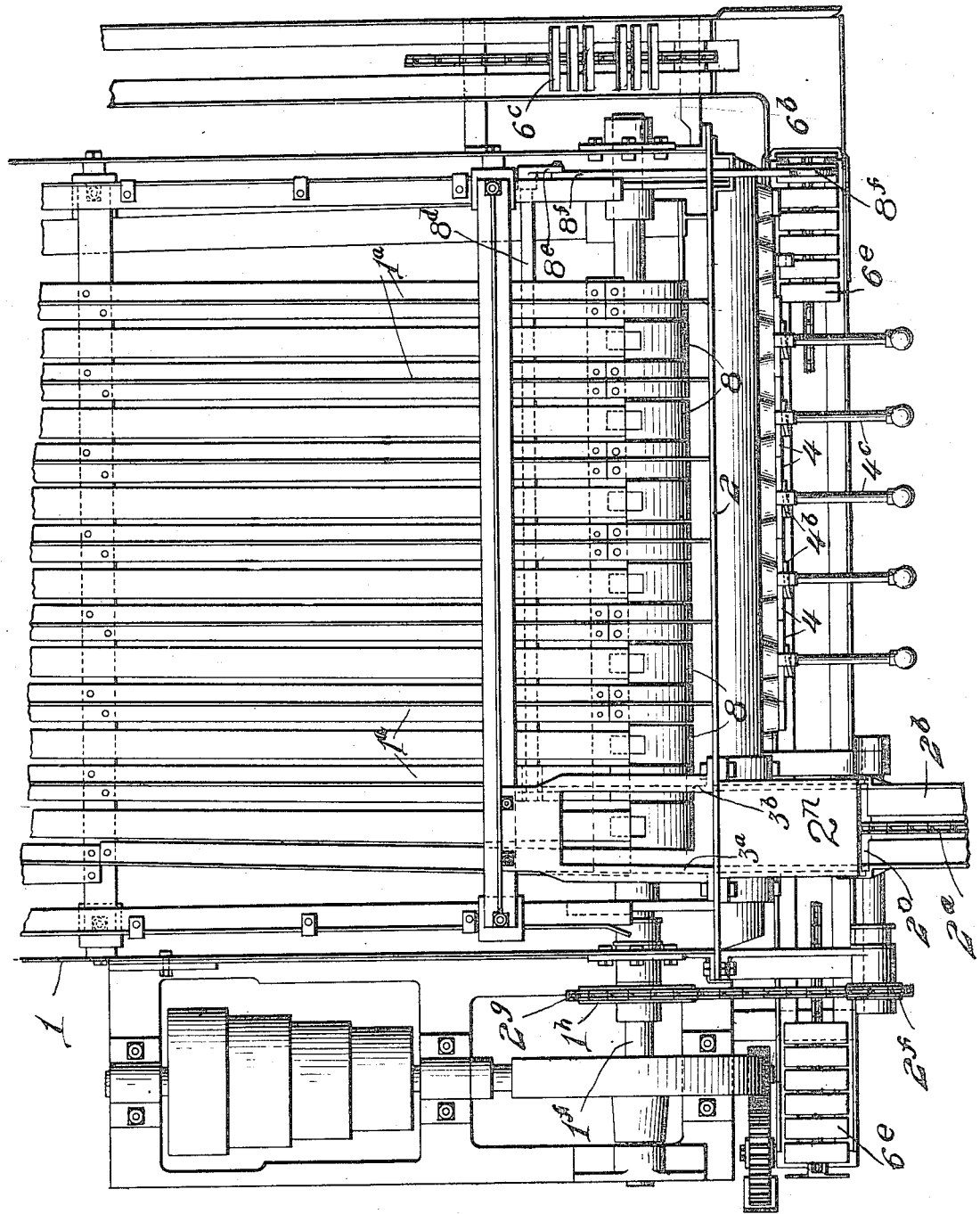

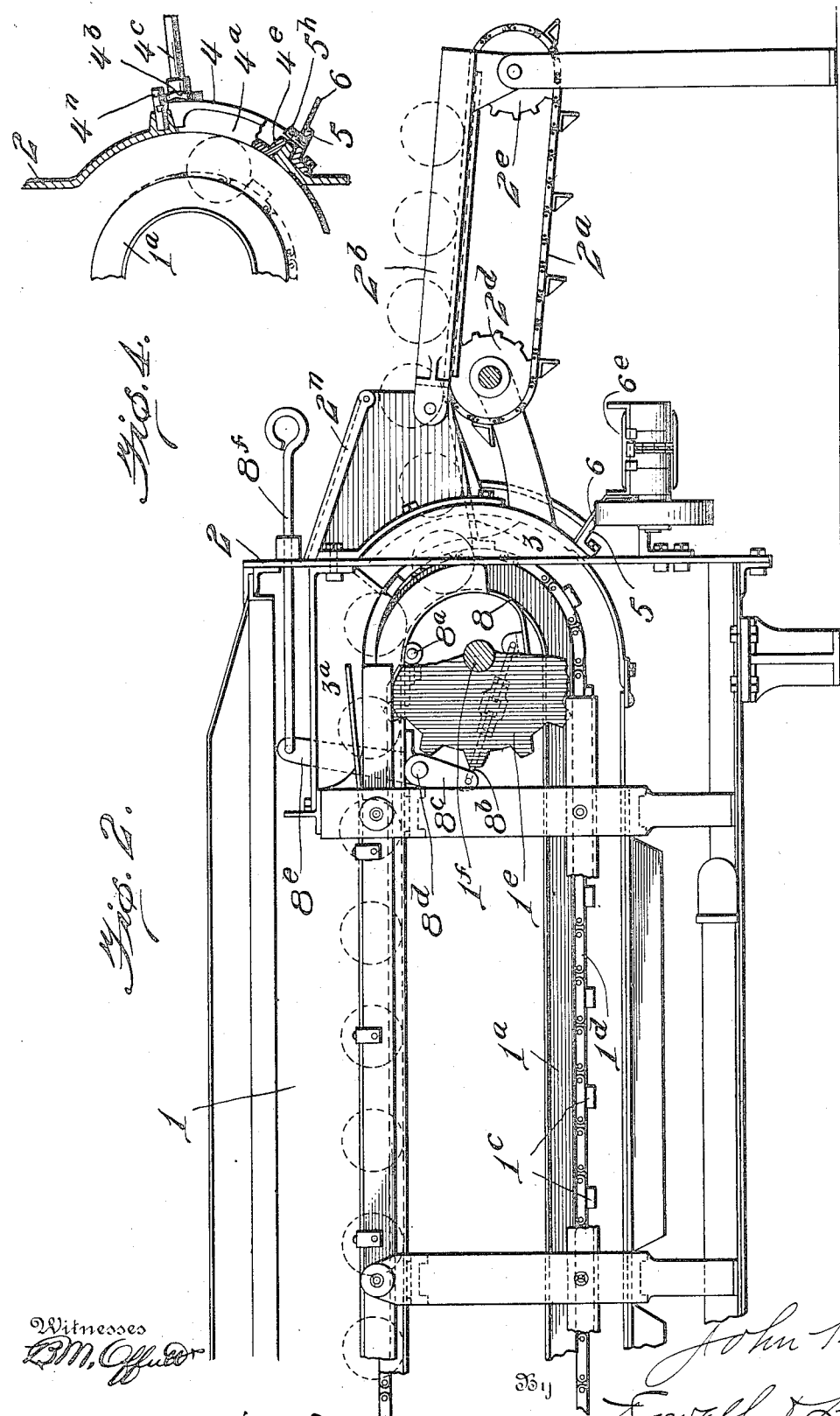

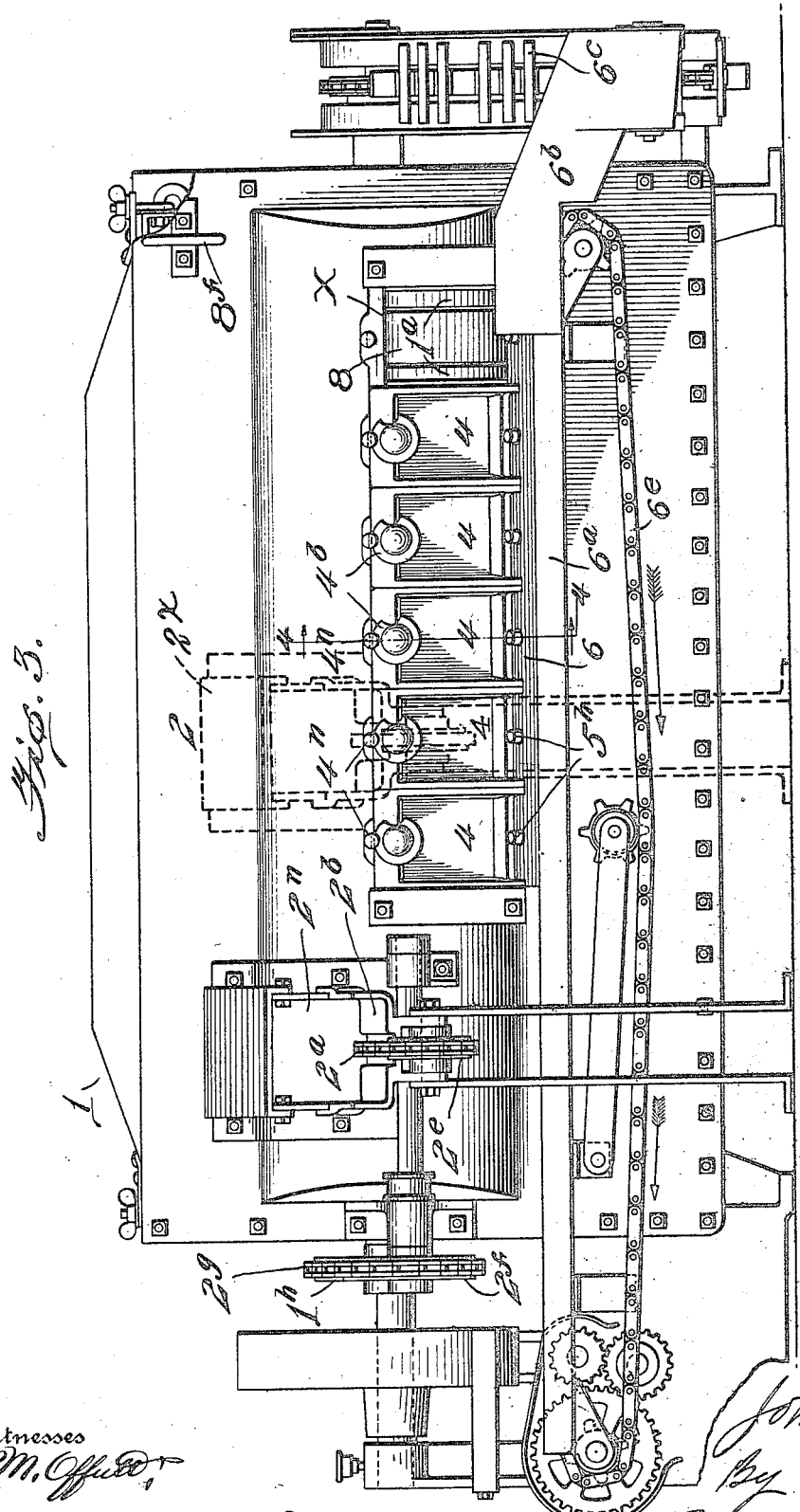

JOHN S. BAKER, OF LOS ANGELES, CALIFORNIA, ASSIGNOR TO BAKER-SHIPPEE MANUFACTURING CO., OF LOS ANGELES, CALIFORNIA, A CORPORATION OF CALIFORNIA.

COOKING-MACHINE.

1,182,832.    Specification of Letters Patent.    Patented May 9, 1916.

Application filed August 6, 1915. Serial No. 44,042.

*To all whom it may concern:*

Be it known that I, JOHN S. BAKER, a citizen of the United States, residing at Los Angeles, in the county of Los Angeles and State of California, have invented certain new and useful Improvements in Cooking-Machines; and I hereby declare that the following is a full, clear, and exact description thereof, reference being had to the accompanying drawings, which form part of this specification.

This invention relates to so-called can-cooking machines of the general type shown in Patent No. 805,184 of November 21, 1905, and adapted for heating, sterilizing or cooking canned foods. These machines are of considerable size and one object of the present invention, as compared with said patented machine, is to enable the cans to be both fed and delivered at one and the same end of the machine, so that one operator can readily observe and control both the feed and delivery of the cans and to keep the back tight so that all heat must escape from front end, and thus a high heat may be maintained at the back; and also to enable the machine to be operated to give the cans a variety of lengths of cook without necessarily altering the speed of the cans traveling through the machine; which is accomplished by providing novel means whereby the cans can be discharged from the machine at any one of a plurality of points or from any run of the canway.

I will explain the invention as embodied in the machine illustrated in the accompanying drawings, and refer to the claims following the description for summaries of the novel features and combinations of parts for which protection is desired.

In said drawings, Figure 1 is a detail top plan view of the feeding and delivery end of a machine embodying the invention with the cover removed. Fig. 2 is an enlarged sectional elevation of Fig. 1. Fig. 3 is an elevation of the feed and delivery end of the machine. Fig. 4 is a detail section on line 4—4, Fig. 3.

As shown in said drawings the machine comprises a tank or chamber 1 in which is arranged a flattened spiral canway $1^a$ along which the cans are propelled by means of pusher bars $1^c$ attached to endless chains $1^d$ running over sprockets $1^e$ attached to shafts $1^f$ at opposite ends of the tank; which shafts can be driven by suitable gearing exterior to the tank; the aforesaid parts may be constructed substantially as described in the above mentioned patent.

One end of the tank 1 is preferably formed by a cast plate 2 which has a feed opening 20 in it adjacent one side of the tank and the first run of the canway, a chute $2^n$ conducts cans to this opening. A feed trough $2^b$ connects with chute $2^n$ and the cans are directed along said trough by sprocket chains $2^a$ running over sprockets $2^e$, $2^d$ the latter of which may be operated by sprockets $2^f$ and chains $2^g$ from a sprocket $1^h$ on the adjacent shaft $1^f$. The can feeding devices may be of any desired construction.

The cans entering the chute $2^n$ are directed onto the upper run of the first spiral of the canway $1^a$, and the cans are moved along the canway by the bars $1^c$ as stated. Side guides $3^a$, $3^b$ may be provided to insure the cans properly entering the canway.

In the plate 2 adjacent the feed chute and about opposite the front curved end of the canway, is a long transverse opening which is closed by a series of removable gates 4, each of these gates is as wide as the width of one of the canway runs, and there are enough of these gates to entirely close the said opening when all are in position, and each plate lies directly opposite the adjacent run of the canway. These gates are preferably curved on their interior surfaces to correspond with the curve of the adjacent portion of the run of the canway, and guide and retain the cans in the related runways when the gates are in place, as indicated in Fig. 4. Each gate has projecting side portions $4^a$ which abut when the gates are in position. When the gates are in place the cans roll up on the inner surfaces of these gates for part of the distance before they pass onto the upper run of the canway.

The gates are independently removable or openable, and when any gate is removed it leaves an opening adjacent the related end of the canway (as indicated at X in Fig. 3) through which opening the cans which start to ascend the adjacent run of the canway will escape by gravity from the interior of the tank. The gates are preferably detachably attached to the casting 1 and as shown in the drawings each gate may be provided with a cam disk $4^b$ attached to a rod $4^c$ rotatably connected to the upper end of the gate, and when the gate is in place the cam is engaged with a notched pin $4^n$ attached to the casting 2, and thus fasten the upper end of the gate in position, see Figs. 3 and 4. The rods $4^c$ form handles by which the gates can be readily manipulated by the operator. Each gate as shown has a flange $4^e$ on its lower end which when the gate is in place engages a pin or stud $5^n$ attached to an angle bar 5 fastened to the casting 2. These studs are adjacent the lower edge of the opening in said plate as indicated in Figs. 3 and 4.

When the gates 4 are in proper position, as shown in Fig. 3, they fit close together, and if all are in place the opening in plate 2 would be closed; but any one of these gates can be opened, and when a gate is detached the cans travel in the canway until they reach the point where the gate is removed and there find an opening left by the gate through which they pass out by gravity.

The machine shown has six such gates arranged opposite the last six runs of the canway, and by removing any one of these gates 4 the cans can be discharged from the tank through the opening left by the removed gate. Of course if there is but one series of cans going through the machine only one gate should be removed, and the gate to be removed depends upon the length of travel and time of cook it is desired to give the cans in the cooker. Thus if cans are traveling through the machine at a uniform rate of speed and it is desired to give them only a very short cook the first gate can be removed. If a longer cook is desired the first gate is replaced and the second gate removed; and if a still longer cook is desired the second gate can be replaced and one of the other gates removed. For a very short cook the gate nearest the feed should be removed, and for the longest cook the gate farthest from the feed should be removed. Further lengths of cooks can be obtained by varying the speed of travel of the cans in the canway by varying or changing the speed of the driven shaft in the usual manner.

A series of adjustable guides 8 may be hinged on a cross rod $8^a$ adjacent the curved ends of the canway, and the lower free ends of these curved guides may be connected by rods $8^b$ to cranks $8^c$ on a rock shaft $8^d$ having a crank arm $8^e$ connected to an operating rod $8^f$ extending outside the tank. When small cans are being cooked these guides 8 can be swung toward the gates 4 to slightly decrease the depth of the canway at the curved ends and thus compel the smaller cans to properly ascend to the upper run of the canway, and prevent the cans catching or jamming.

The machine could be provided with a plurality of can feeds to different runs of the canway; for instance one feed can supply cans to the first run of the canway as shown in Fig. 3 and another feed (as shown in dotted lines $2^x$ in Fig. 3 but a duplicate of that shown) could supply cans to an intermediate run of the canway, and with such an arrangement a plurality of series of cans can be simultaneously operated upon; those from the first feed being discharged through an opening caused by removing one of the gates between the first and second feeds; and those from the second feed being discharged from an opening caused by removing one of the gates opposite a run of the canway beyond the second feed. Additional feeds might be provided if desired and additional discharge gates according to the desired capacity of the cooker. The multiple feeds however are shown and described in my application for Can Cooking Machine filed August 10, 1915, Serial No. 44,789, and therefore are not illustrated and described herein.

By reason of the elongated flat spiral canway the cans or packages being treated can be given any desired length of travel, or extent of treatment, and the extent of cook of the cans in passing through the tank can be varied both by varying the speed of travel of the cans, and also by varying or changing the point of discharge of the cans from the tank, as will be well understood by those familiar with the art.

The tank can be heated by hot water, steam or other suitable medium; usually it is heated by steam and hot water; the water level being below the lower edge of the discharge opening.

The cans as they ascend around the curve of the canway at the front end of the machine will drop out by gravity through any opening left by the opening or removal of any gate 4.

The cans escaping through the opening left where a gate is removed are directed over a chute board 6 into a conveyer trough $6^a$ from which they are discharged by an endless conveyer $6^e$ into a chute $6^b$ which directs them onto an endless conveyer $6^c$ by which they are conducted to any desired point.

While I have described the machine as employed for handling cans it can also be used for drying, heating or sterilizing same.

What I claim is:

1. In combination, a chamber, means for moving packages therein, means for feeding packages at one end of the chamber, and means for discharging packages at the same end of the chamber, said means comprising an opening, and a series of gates adapted together to close said opening, any gate being removable from the opening to leave an outlet for the packages.

2. In combination, a chamber, a canway therein, means for moving cans along said canway, a feed opening adjacent one end of the canway, an opening adjacent the feed opening, a plurality of gates adapted together to close such opening, any gate being openable to permit escape of cans.

3. In combination, a chamber, a spiral canway therein, means for feeding cans to the canway at one end thereof, a discharge opening, a plurality of side by side gates adapted together to close said opening, each of said gates lying opposite a run of the canway, and when opened permitting escape of the cans traversing such run of the canway.

4. In combination, a chamber, a canway therein, means for moving cans along said canway, a feed opening adjacent one end of the canway, an opening adjacent the feed opening, a series of gates adapted together to close such opening, any gate being removable from the opening to permit escape of cans through the space left by the removed gate.

5. In combination, a chamber, a spiral canway therein, means for feeding cans to the canway at one end thereof, a discharge opening adjacent the same end of the canway, a plurality of side by side gates adapted together to close said opening, each gate lying opposite a run of the canway, and when removed leaving a space through which the cans traversing such run of the canway escape.

6. In combination with a chamber, means for moving cans therethrough, and means for feeding cans to the chamber with an elongated opening in the tank, a plurality of gates together closing said opening and means for securing the gates in position, any gate when removed from the opening leaving a space through which cans may discharge.

7. In combination with a tank, means for moving cans therethrough, means for feeding cans to the chamber, an elongated opening in one end of the tank, a plurality of removable gates together closing said opening, and means for detachably securing the gates in position, any gate being removable to leave a space through which the cans may be discharged.

8. In combination a chamber, a canway therein, means for moving cans along the canway, and means for feeding cans to the canway, an elongated opening in the tank, a series of side by side gates adapted together to close said opening, each gate being provided with means for detachably securing it in place, and any gate being removable to leave a space through which the cans can escape.

9. In combination with a tank or chamber, a spiral canway therein, means for moving cans along the canway, and means for feeding cans to the canway, an elongated opening in the feed end of the tank, a series of side by side gates adapted together to close said opening, each gate being provided with means for detachably securing it in place, and any gate being removable to leave a space through which the cans can escape.

10. In combination with a tank having a large discharge opening, and means for moving cans through the tank; with a series of side by side gates adapted together to close said opening when in place, each gate having an inner curved face adapted to guide the can, and means for securing each gate in place.

11. In combination a tank, having a discharge opening, and means for moving cans through the tank; with a plurality of side by side gates adapted together to close said opening when in place, and a can rotatably connected with each gate and means on the tank to engage said cam and hold the gate closed.

12. In combination with a tank, having a discharge opening, and means for moving cans through the tank; with a series of side by side gates adapted together to close said opening when in place, each plate having an inner curved face adapted to guide the can when the gate is in place, a cam rotatably connected with the gate, and a locking member adapted to be engaged by the cam to hold the gate closed.

13. In combination a tank, having a large discharge opening, and means for moving cans through the tank; with a series of side by side gates adapted together to close said opening when in place, and a cam rotatably connected with each gate and means on the tank to engage the gate and said cam.

14. In combination with a tank, a casting having a large discharge opening, and means for moving cans through the tank; with a series of side by side gates adapted to close said opening when in place, each plate having an inner curved surface adapted to guide the cans when the gate is in place, a cam rotatably connected with the gate, and notched pins attached to the casting over the opening adapted to be engaged by the cams to hold the gates closed.

15. In combination with a tank, a spiral canway therein having vertical bends and along which the cans are adapted to be rolled, means for rolling cans along said way and adjustable means at the vertical bends of said way for varying the depth of the canway at the bends to prevent the cans jamming in such bends.

16. In combination a cooking chamber, a spiral canway therein having vertical bends, means for rolling cans along said canway, an adjustable guide at the vertically disposed bends of the canway for varying the depth of the canway runs at such bends to compel cans to properly pass around such bends without catching or jamming therein.

17. In combination a cooking chamber, a canway therein, endless means adapted to move the cans along said canway, and gearing for operating said means; said chamber having a feed opening communicating with the canway, and a discharge opening adjacent one end of the spiral canway; with a plurality of gates adapted together to close such discharge opening; any gate being openable to permit escape of cans traversing the related run of the canway.

18. In combination a chamber having a feed opening and a large discharge opening, a canway in said chamber, sprocket chains and bars connected therewith for moving cans along said canway, means for operating said chains, means for directing cans to the canway through the feed opening, and a plurality of side by side gates adapted to close said discharge opening, each gate lying opposite a run of the canway and when opened leaving a space through which the cans traversing the related run of the canway escape.

19. In combination a cooking chamber, a spiral canway therein, chains carrying presser bars adapted to move the cans along said canway, and means for operating said chains, a feed opening in the chamber communicating with the canway, a discharge opening in the chamber adjacent one end of the spiral canway, and a plurality of gates adapted together to close such discharge opening; any gate being openable to permit escape of cans traversing the adjacent run of the canway.

20. In combination a chamber, a spiral canway therein, sprocket chains and bars for moving cans along said canway, means for operating said chains, means for feeding cans to the canway at one end thereof, a discharge opening adjacent the same end of the canway, and a plurality of side by side gates adapted to close said discharge opening, each gate lying opposite a run of the canway and when opened leaving a space through which the cans traversing the related run of the canway escape.

In testimony that I claim the foregoing as my own, I affix my signature in presence of two witnesses.

JOHN S. BAKER.

Witnesses:
H. C. SHIPPEE,
RALPH SUGRUE.